Figure 1:
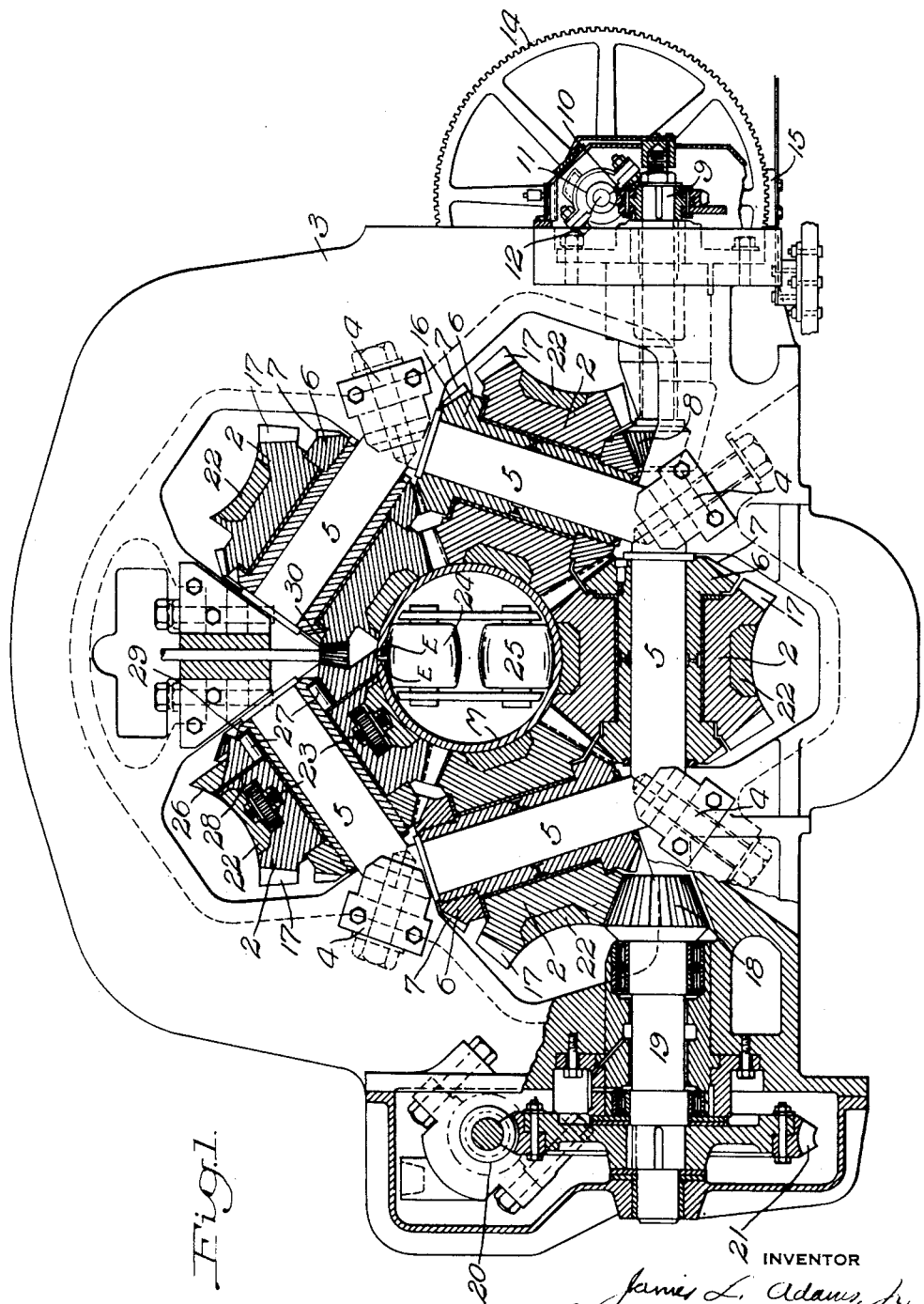

Dec. 4, 1934.　　　J. L. ADAMS, JR　　　1,983,159
APPARATUS FOR WELDING
Filed Oct. 7, 1930　　2 Sheets-Sheet 2

INVENTOR

Patented Dec. 4, 1934

1,983,159

UNITED STATES PATENT OFFICE 1,983,159

APPARATUS FOR WELDING

James L. Adams, Jr., Youngstown, Ohio, assignor to The Youngstown Sheet & Tube Company, Youngstown, Ohio, a corporation of Ohio Application October 7, 1930, Serial No. 486,986

9 Claims. (Cl. 219—6)

The present invention relates to the art of forming electrically welded articles, and more particularly to an improved method and apparatus by means of which surplus metal and impurities may be removed from the vicinity of the seam at or substantially at the actual time of formation of the weld.

It is customary in the art of producing welded articles to suitably heat the edges to be welded and thereafter bring the heated edges together under sufficient pressure to effect the weld. Regardless of the manner of heating, the pressure incidental to the welding operation effects the ejection or extrusion of a portion of the previously heated metal. Heretofore no efficient means has been provided for effecting the removal of such excess metal in such time relationship to the formation of the weld itself as to provide a finished article characterized by a seam free from impurities and substantially flush at all portions thereof with the remainder of the parent metal in which the weld is formed.

Where the heating is performed electrically as, for example, by inducing a heating current in the material while maintaining the edge portions thereof in slightly spaced relationship such as to define a flash zone, the heating operation itself also tends to eject metal or metal particles, and deposit the same along the seam. This forms "stringers" lying loosely on each side of a seam which, being cooler and harder than the seam, are embedded therein on the application of welding pressure but with imperfect adhesion, producing unsightly depressed grooves along the seam. Subsequent removal of the stringers by chipping or otherwise decreases the weld thickness and weakens the product. In accordance with the present invention, such metal particles are also removed substantially simultaneously with the formation of the weld.

The extruded material represents the hottest metal, including the surface layer on the edge thereof, which is most likely to contain the greater portions of scale, oxide, and dirt, which it is desired to eliminate from the finished weld. Grooved rolls to permit outflow of such objectionable materials have been employed with fair success but also have distinct disadvantages.

In the first place, the groove permits excessive outflow of molten metal and thus prevents the building up of the desired high welding pressure. The result of the impossibility of obtaining the required welding pressure is that faulty spots are found in the welded seam.

In the second place, a grooved welding roll affords an excellent opportunity for the edges of the seam to slip past each other if there is the slightest angularity in the burned-off edge. This slippage also prevents the application of high welding pressure between the seam edges. A weld formed with insufficient pressure fails readily under hydrostatic test. The lapping also results in a loss of a fraction of the full thickness of metal at the weld, leaving a seamed and flimsy joint which is difficult to trim or finish so as to present a salable appearance. Welding rolls without grooves prevent edge slippage even if the burned-off edge has a considerable angle, as the two edges are held in positive alignment, permitting the welding pressure to be raised to the value required for a good joint.

In the third place, a grooved roll requires that the hot seam be precisely aligned with the groove. This position is very difficult to obtain when the edge guiding means are located some distance from the welding means, which is a necessary arrangement in any practical form of machine.

It has heretofore been proposed to provide welding apparatus characterized by means located an appreciable distance in advance of the welding zone for effecting a cleaning of the outer edge surfaces, and it has also been proposed to construct apparatus having seam trimming or removing means located on the discharge side of the apparatus and more or less removed from the welding zone. With the former apparatus any extruded metal formed intermediate the cleaning zone and the welding zone has not been removed and was consequently often pressed into the seam itself or adjacent parent metal. With the latter type of apparatus, the removal has occurred only after the undesirable particles have been pressed into the seam and was therefore ineffective for preventing such a pressing-in operation and the consequent pitting of the surface adjacent the seam and the weakening of the seam itself.

To my knowledge it has never heretofore been proposed to provide mechanism effective for removing any such surplus material substantially concomitantly with the application of welding pressure and in the zone or approximate zone of such welding pressure. My invention relates particularly to the provision of means for accomplishing the removal of surplus metal in such zone so that at the time of the actual formation of the weld surplus metal is removed therefrom and prevented from detracting from the appearance of the finished article, encroaching upon its surfaces, or weakening the weld itself.

Figure 2:
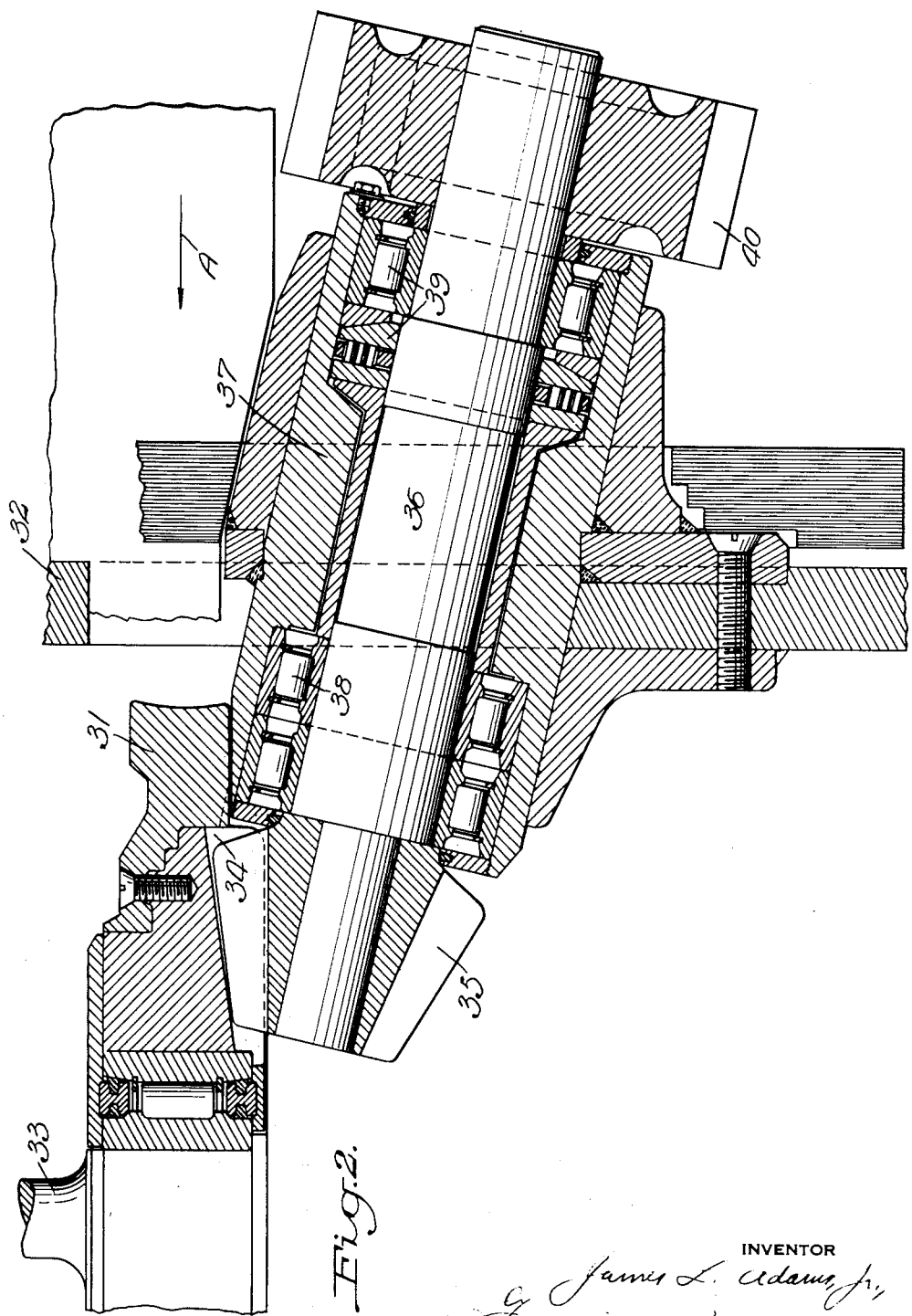

In the accompanying drawings there are shown for purposes of illustration only, and more or less diagrammatically, certain preferred embodiments of the present invention. In the drawings:

Figure 1 is a view partly in section and partly in elevation illustrating one embodiment of the invention; and Figure 2 is a detail sectional view illustrating another embodiment of the invention.

While the present invention is adaptable to the formation of welds in substantially flat articles or in substantially tubular articles such as pipes, tubes, columns and the like, it is herein illustrated as applied particularly to the formation of so-called tubular articles, although it will be apparent as the invention becomes better understood that the utility thereof is not limited with respect to the characteristics of the articles themselves.

In the drawings I have illustrated a portion of a welding apparatus of the general type disclosed in my co-pending application Serial No. 453,888 filed May 20, 1930. Such an apparatus includes means for heating the material as well as means for applying welding pressure to the heated material for effecting the weld. The pressure is conveniently applied by the use of rolls defining a pass of the desired cross sectional contour for the particular material being formed. The pass in the drawings is illustrated as of substantially circular contour formed by a series of pressure applying and welding rolls 2 mounted within a housing 3. The housing is shown as having bearings 4 for shafts 5, the bearings being such that the shafts themselves are held against rotation.

Surrounding each of the shafts is a sleeve 6 the periphery of which is eccentric to the axis of the shaft. These sleeves are provided with suitable gears 7 meshing one with the other whereby rotation of one of the sleeves effects simultaneous rotation of all of the sleeves. Such rotation may be acomplished in any desired manner as, for example, by a pinion 8 carried by a shaft 9 having a worm wheel 10 adapted to be rotated by a worm 11. The worm 11 is carried by a shaft 12 adapted to be rotated by the hand wheel or gear 14. For holding the wheel or gear 14 in its adjusted position there may be provided a pawl or detent 15.

In the construction just described, it will be apparent that rotation of the wheel or gear 14 will effect simultaneous rotation of all of the eccentric sleeves 6, thereby simultaneously moving all of the rolls 2 either inwardly or outwardly to change the diameter of the pass formed thereby. The length of the teeth 17 on the rolls 2 is sufficient to permit such an adjusting movement.

The rolls 2 are likewise illustrated as provided with teeth 17 meshing with corresponding teeth on an adjacent roll whereby simultaneous rotation of all of the rolls may be effected. Such a rotation is herein shown as produced by a pinion 18 on a shaft 19 driven by a worm 20 through the medium of a worm wheel 21. Such rotation of the pressure producing welding rolls 2 is in a direction effective for feeding the material through the roll pass.

To provide for renewal of the roll surfaces in contact with the material M being welded, I have shown the same as provided with removable tires 22 replaceable at the will of the operator by the proper actuation of holding screws 23.

In Figure 1 of the drawings, the material M is illustrated as being so disposed that the edge portions E will be brought together on substantially the vertical median plane of the pass and directly over the roller 24 located within the material and cooperating with a second similar roller 25 in engagement with a diametrically opposite portion of the material.

The meeting plane of the edges E defines the proposed line of weld. In order to insure the formation of the weld within a substantially confined area, I have shown one of the rolls 2 as having an extension 26 provided thereon and overlapping the line of weld. This extension is preferably in the form of a disk or ring, the periphery of which is herein illustrated as being ragged or cross hatched to give a roughened quasi-abrading, cutting and gripping surface. This disk may be carried upon one of the eccentric sleeves 6 through the medium of an anti-friction bearing 27, and spaced slightly from the adjacent roll 2 by a thrust washer 28. Cooperating with the outer side of the disk 26 is a second thrust washer 29. The anti-friction bearing and thrust washers provide such a mounting for the disk 26 that it may be rotated in opposition to the direction of rotation of the rolls 2 and therefore in opposition to the forward travel of the material M through the roll pass.

Such a reverse rotation of the disk 26 may be obtained in any desired manner. I have herein illustrated the disk, however, as being driven by the roll 2 lying on the opposite side of the line of weld, through the medium of a reversing pinion 30 or its equivalent. With such a reversing pinion, the disk 26 will be rotated simultaneously with the rotation of the rolls 2 but in a direction opposite thereto. Inasmuch as it directly overlies the line of weld, and is within the pressure zone defined by the rolls 2, such reverse rotation thereof effectively removes any surplus material extruded either by the pressure or by the previous heating operation, and prevents the same from being rolled into the seam during the formation of the weld.

I have found that by a construction of this character it is possible not only to continuously remove surplus metal, and particularly metal of such characteristics that it would be injurious to the weld and to the appearance of the finished article, but to remove the same at a time so related to the time of formation of the weld that during the actual production of the weld the only metal available for the weld itself is metal at a welding temperature lying substantially in the space defined by the edges E. In this manner it is possible to form a weld having a thickness exactly equal to the thickness of the parent metal and therefore substantially flush with the surface thereof. It will be apparent, however, that where it is desired to produce a seam of slightly greater thickness than the thickness of the parent metal, the diameter of the disk 26 can be reduced accordingly. In like manner, the peripheral contour of the disk may be such as to give to the finished seam any desired configuration.

In the form of the invention just described, the cleaning or metal removing disk 26 is illustrated as driven from one of the rolls forming the pressure applying pass. It is obvious, however, that the disk may be otherwise driven, and in Figure 2 of the drawings there is illustrated one form of drive for such disk. This permits a wider choice of operating speeds here. In accordance with the showing of Figure 2 the disk 31, corresponding to the disk 26 previously described, is disposed within a welder housing 32 in such manner as to cooperate with the seam during its formation. In this figure of the drawings the direction of pipe travel is illustrated by the arrow A. In the case of an apparatus utilized for the formation of the top seam, the arrow A will directly overlie the axis of the roll pass, while in case a bottom seam is being formed it will directly underlie such pass.

The disk 31 may be carried by a suitable shaft 33 mounted in bearings (not shown) carried by the housing 32 and effective for maintaining the disk both in seam excess metal removing position and in proper cooperative relation to the rolls forming the welding pass.

Secured to one face of the disk 31, and serving as a mounting for the latter, is a gear 34 with which meshes a pinion 35 on a shaft 36 projecting rearwardly through the back wall of the welder housing 32. For supporting this shaft the welder housing may have secured thereto a sleeve 37 at the forward end of which is provided a bearing 38 preferably located adjacent the disk 31. At the opposite end of the sleeve is a combined thrust and roller bearing 39 beyond which the shaft carries a gear 40 adapted to be driven in any desired manner for rotating the disk 31 in either direction. This figure of the drawings illustrates the adaptability of the invention to different forms of drives while retaining all of the advantages previously set forth. It will further be apparent from the description just given that the construction and operation of the disk is not limited by the constructional features of the welding apparatus itself.

While the drawings illustrate the weld as being formed between the adjacent edges of substantially tubular preformed material, it will be apparent that the adjacent edge portions of such material may be considered as representative of the edges of substantially flat sheets or plates, or of any other desired material which is to be welded.

Certain advantages of the present invention arise from the provision of abrading means, or surplus metal removing means located in or approximately in the zone of welding pressure application.

Other advantages of the invention arise from the provision of means effective for moving surplus or extruded metal rearwardly in opposition to the direction of feeding movement of the material being welded in such manner as to continuously perform a cleaning operation and permit only the metal which it is desired to utilize in the actual formation of the weld to pass into the zone of welding pressure.

Still further advantages arise from the method of simultaneously or substantially simultaneously applying pressure and removing surplus metal within a substantially common zone.

Other important advantages accrue from the use of apparatus which holds the seam edges in precision alignment in the pressure welding zone and which allows edge-to-edge pressure to be exerted even on edges which may have been burnt off at an angle to a true radial plane, without slippage past each other when the pressure increases. At the same time, some extrusion of the hottest metal and the undesirable inclusions associated therewith is effected, as well as the immediate removal thereof from the welding zone. A further advantage is that the tube is delivered from the welder in finished condition requiring no further trimming or dressing of the seam to get a product with a good commercial appearance.

While I have herein illustrated and described a preferred embodiment of the invention, it will be understood that changes in the construction and operation therein disclosed may be made without departing either from the spirit of the invention or the scope of my broader claims. Thus the invention may be adapted to cleaning of the inside surface instead of, or together with, the outer surface of the material.

I claim:

1. In a welding apparatus, a plurality of rolls defining a pressure welding pass for forming a seam weld with one of the rolls in overlapping relationship to the seam weld, and means for driving said rolls at different speeds with the roll overlapping the seam weld moving at such a peripheral speed as to produce progressive cleaning abrasion along the hot seam.

2. In a welding apparatus, a roll stand for forcing together heated edges of material to form a seam, one of the rolls of said stand having a portion at least overlying said seam, and means for driving said portion at a speed different from the other rolls of the stand to remove surplus material from the seam as it is extruded therefrom.

3. In a welding apparatus, the combination with a pressure roll stand for forcing together heated edges of material, including means for rolling down one side of said seam, of means at said stand for engaging the other side of the seam to remove surplus material therefrom.

4. In a tube welding apparatus, the combination with a plurality of rolls positioned in substantially the same plane to define a pressure roll stand for forcing together the edges of a tube to form a welded seam, of means for driving one of said rolls to effect removal from said seam of excess material extruded therefrom.

5. In a continuous seam welder, a plurality of pressure rolls for forcing together the edges of material to form a welded seam, one of said rolls bridging the seam, and means for driving the seam-bridging roll in a direction opposite that of the remaining rolls.

6. Welding apparatus, comprising a plurality of pressure rolls journaled substantially in a common plane, said rolls engaging work to be welded and forcing together heated edges of the work to form a welded seam, means for rotating at least one of said rolls to advance the work in a direction substantially parallel to the seam while forming said seam, said rolls at one side of said seam being mounted so as to provide a space therebetween communicating with said seam at said side, a roll spanning said seam at the opposite side thereof for rolling down the same, and metal removing means extending within said space in engagement with the seam substantially in said plane effective for removing metal extruded from the seam during advancement of the work and before said extruded metal has solidified, whereby to prevent said extruded metal from becoming a part of said seam.

7. Welding apparatus, comprising a plurality of pressure rolls journaled substantially in a common plane, said rolls rotatably engaging work to be welded during advancement of the work therethrough and forcing together heated edges of the work to form a welded seam, said rolls being mounted so as to provide a space therebetween communicating with said seam at one side, and rotary means extending within said space, journaled substantially in said plane and inclined with respect to a plane passing through said seam in the direction of its depth, said rotary means having a portion in engagement with said seam effective for removing metal extruded from the seam during advancement of the work and before said extruded metal has solidified, whereby to prevent said extruded metal from becoming a part of said seam.

8. Welding apparatus, comprising a plurality of pressure rolls journaled substantially in a common plane, said rolls rotatably engaging work to be welded during advancement of the work therethrough and forcing together heated edges of the work to form a welded seam, said rolls at one side of said seam being mounted so as to provide a space therebetween communicating with said seam at said side, a roll spanning said seam at the opposite side thereof for rolling down the same, and metal removing means extending within said space in engagement with the seam substantially in said plane effective for removing metal extruded from the seam during advancement of the work and before said extruded metal has solidified, whereby to prevent said extruded metal from becoming a part of said seam.

9. Welding apparatus, comprising a plurality of pressure rolls journaled substantially in a common plane, said rolls rotatably engaging work to be welded during advancement of the work therethrough and forcing together heated edges of the work to form a welded seam, said rolls at one side of said seam being mounted so as to provide a space therebetween communicating with said seam at said side, a roll spanning said seam at the opposite side thereof for rolling down the same, and rotary metal removing means extending within said space in engagement with said seam and journaled substantially in said plane effective for removing metal extruded from the seam during advancement of the work and before said extruded metal has solidified, whereby to prevent said extruded metal from becoming a part of said seam.

JAMES L. ADAMS, Jr.